United States Patent
Cosner et al.

(10) Patent No.: US 10,773,835 B2
(45) Date of Patent: Sep. 15, 2020

(54) FLEXIBLE SATELLITE FOR DEPLOYMENT FROM ATTACHMENT HUB

(71) Applicant: Raytheon Company, Waltham, MA (US)

(72) Inventors: Christopher M. Cosner, Manhattan Beach, CA (US); Michael S. Baldwin, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 316 days.

(21) Appl. No.: 15/827,524

(22) Filed: Nov. 30, 2017

(65) Prior Publication Data

US 2019/0161215 A1 May 30, 2019

(51) Int. Cl.
*B64G 1/10* (2006.01)
*B64G 1/64* (2006.01)

(52) U.S. Cl.
CPC ............. *B64G 1/641* (2013.01); *B64G 1/10* (2013.01); *B64G 1/645* (2013.01)

(58) Field of Classification Search
CPC ... B64G 1/641; B64G 1/645; B64G 2001/643
USPC ...................................... 244/173.3
See application file for complete search history.

(56) References Cited

U.S. PATENT DOCUMENTS

| | | | | |
|---|---|---|---|---|
| 3,478,986 A | * | 11/1969 | Fogarty | B64G 1/12 244/159.4 |
| 5,052,640 A | * | 10/1991 | Chang | B64G 1/002 136/292 |
| 5,242,135 A | | 9/1993 | Scott | |
| 6,206,327 B1 | | 3/2001 | Benedetti | |

(Continued)

FOREIGN PATENT DOCUMENTS

| | | | | |
|---|---|---|---|---|
| EP | 3100954 A1 | | 12/2016 | |
| FR | 2839949 A1 | * | 11/2003 | ............. B64G 1/641 |
| FR | 3004166 B1 | | 4/2015 | |

OTHER PUBLICATIONS

Maly et al.; "Adapter Ring for Small Satellites on Responsive Launch Vehicles"; Proceedings of the AIAA/7th Responsive Space Conference; American Institute of Aeronautics & Astronautics 7th Responsive Space Conference, Los Angeles, CA, Apr. 27-30, 2009; Apr. 1, 2009 (Apr. 1, 2009), p. 9pp.

*Primary Examiner* — Christopher P Ellis

(74) *Attorney, Agent, or Firm* — Renner, Otto, Boisselle & Sklar, LLP

(57) ABSTRACT

An exemplary satellite includes a pair of payloads coupled to one another by a flexible boom, where the flexible boom is configured to enable easy manual engagement of the pair of payloads with an associated attachment hub, and also to provide a passive release force for deploying at least one of the payloads in a direction outwardly from the attachment hub. Potential energy for enabling the passive release is provided as stored strain energy in the flexible boom when flexed for attachment of the payloads to the attachment hub. The strain energy is released upon release of at least one of the payloads from the attachment hub, which release may be by way of a non-complex, non-exotic attachment mechanism. Additional payloads may be connected in series to the pair of payloads, with a flexible boom connecting adjacent payloads. The additional payloads may be released from the attachment hub via a non-complex or complex attachment mechanism.

20 Claims, 8 Drawing Sheets

(56) References Cited

U.S. PATENT DOCUMENTS

| | | | |
|---|---|---|---|
| 6,220,548 B1 | 4/2001 | Hyman | |
| 8,550,408 B2* | 10/2013 | Ross | B64G 1/641 |
| | | | 244/159.4 |
| 8,720,830 B1 | 5/2014 | Szatkowski | |
| 8,789,797 B2 | 7/2014 | Darooka | |
| 8,876,062 B1* | 11/2014 | Baghdasarian | B64G 1/222 |
| | | | 16/231 |
| 9,004,409 B1* | 4/2015 | Baghdasarian | B64G 1/22 |
| | | | 244/172.6 |
| 2013/0009012 A1* | 1/2013 | Kobayashi | B64G 1/645 |
| | | | 244/173.3 |
| 2016/0102689 A1* | 4/2016 | Madsen | B64G 1/641 |
| | | | 244/173.1 |

* cited by examiner

FLEXIBLE SATELLITE FOR DEPLOYMENT FROM ATTACHMENT HUB

FIELD OF THE INVENTION

The invention relates generally to a satellite for deployment from an attachment hub, and more particularly to a flexible small-sat for attachment to and deployment from an ESPA-class hub, and a method of attachment and deployment of the flexible small-sat from the ESPA-class hub.

DESCRIPTION OF THE RELATED ART

Development of small satellites, also known as small-sat's, requires adherence to a lengthy list of requirements including those for weight, volume, mass, dimensions, spacing, etc. These requirements often lead to a need for low-power low thermal dissipation specifications and thus can in turn lessen mission utility of a small-sat. The requirements also often lead to dense packaging of on-board equipment and of deployment equipment.

For example, in the case of satellites having payloads that are attachable and deployable from an evolved expendable launch vehicle (EELV) secondary payload adapter (ESPA), payload modules must adhere to the many previously-listed requirements. A deployed satellite may include numerous payloads that are interconnected in some manner both in an attached and deployed state. The interconnection itself may limit mission utility due to the need to stabilize payload modules relative to one another after deployment, or the need to bring payload modules into engagement with one another. Thus, the interconnection equipment often requires moving parts, which in turn limits or altogether prevents connectivity between payload modules with respect to one or more aspects, such as electrical connectivity, thermal connectivity, RF connectivity, and power connectivity.

Furthermore, deployment mechanisms are required for each payload module, and the complexity of such deployment mechanisms often increases comparative to the interconnectedness of the payload modules. One example of a complex and often costly deployment mechanism is a Lightband from Planetary Systems Corporation. In each of these examples, complexity typically increases weight, mass, volume, power needs, cost, and the number of components carrying risk of malfunction.

SUMMARY OF THE INVENTION

The present disclosure provides an exemplary satellite that is attachable and deployable from an attachment hub, such as an ESPA-class hub, and that addresses many of the prior-listed concerns. The exemplary satellite includes at least a pair of payload modules, also referred to as payloads, coupled to one another by a flexible member. The flexible member is configured to meet the requirements for torque at the ESPA interfaces, stiffness requirements during attachment to the ESPA hub, and also stiffness needs for deployed operation. The flexible member enables continued connectivity between adjoined payloads thereby eliminating the need for complex systems to bring payloads into engagement with one another to establish such connectivity. Moreover, the flexible member assists in deployment of one or more of the payloads, thereby reducing or altogether eliminating the need for one or more complex and costly deployment mechanisms.

An exemplary satellite includes a pair of payloads coupled to one another by a flexible boom, where the flexible boom is configured to enable easy manual engagement of the pair of payloads with an associated attachment hub, and also to provide a passive release force for deploying at least one of the payloads in a direction outwardly from the attachment hub. Potential energy for enabling the passive release is provided as stored strain energy in the flexible boom when flexed for attachment of the payloads to the attachment hub. The strain energy is released upon release of at least one of the payloads from the attachment hub, which release may be by way of a non-complex, non-exotic attachment mechanism. Additional payloads may be connected in series to the pair of payloads, with a flexible boom connecting adjacent payloads. The additional payloads may be released from the attachment hub via a complex of non-complex attachment mechanism.

According to one aspect, a satellite includes a pair of payloads and a flexible boom extending between and coupled to each of the payloads. The satellite is configured to engage an attachment hub by flexing the boom, and to provide for a passive release force of the satellite from the attachment hub.

The passive release force may provide for passive separation of at least one of the payloads outwardly away from the attachment hub.

The flexing of the boom may allow for attachment of each of the payloads spaced from one another about the hub.

The flexible boom may have a single rest position.

The flexible boom may extend along a non-straight linear central path between the payloads.

The flexible boom may be a hingeless boom.

At least one of the payloads may include a coupling that is configured to detachedly release the payload from the attachment hub without applying a force to the payload to deploy the payload outwardly away from the attachment hub.

The boom in all configurations may allow for continuous thermal, RF, or electrical connection between the payloads.

The boom in all configurations may be configured to prevent physical engagement of the payloads with one another.

The satellite may further include a third payload and a second flexible boom extending between and coupled to the third payload and one payload of the pair of payloads, wherein the satellite including the three payloads and the two flexible booms is configured to engage the attachment hub by flexing the two booms, and to provide for a passive release force of the satellite from the attachment hub.

The satellite may be in combination with the attachment hub having a plurality of ports, with at least one payload of the pair of payloads attached to the attachment hub at one of the ports.

According to another aspect, a satellite includes a pair of payloads each having an attachment portion for separately attaching to a port of an attachment hub, and a coupling member extending between and coupled to each of the payloads of the pair of payloads, wherein the coupling member is configured to transition between a biased state for attachment to the attachment hub, with the coupling member having stored energy, and a default state for at least partial deployment outwardly from the attachment hub, after release of the stored energy.

The payloads may be spaced closer together when the coupling member is in the biased state than when the coupling member is in the default state.

The coupling member may be configured such that it has a single default state.

The coupling member in all states may be configured to allow for continuous thermal, RF, or electrical connection between the payloads.

The coupling member in all states may be configured to prevent physical engagement of the payloads with one another.

The satellite may further include a third payload and a second coupling member extending between and coupled to the third payload and one payload of the pair of payloads, wherein the second coupling member is configured to transition between a biased state for attachment to the attachment hub, with the second coupling member having stored energy, and a default state for at least partial deployment outwardly from the attachment hub, after release of the stored energy.

According to another aspect, a method of deployment of a satellite from an attachment hub includes the steps of (a) providing the satellite having a pair of payloads with a flexible boom extending therebetween, and each of the payloads being coupled to the attachment hub; (b) releasing the coupling of one of the payloads relative to the attachment hub; and (c) transitioning the flexible boom from a biased state having stored strain energy to a default state, thereby outwardly deploying the one of the payloads from the attachment hub via release of the stored strain energy from the flexible boom.

The release of the stored strain energy from the flexible boom may include the boom unflexing from being flexed in the biased state.

The method may further include the step of releasing a coupling member selectively coupling the payload to the attachment hub, without the coupling member applying a force to the payload that would deploy the payload outwardly away from the attachment hub.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present disclosure is generally directed to a satellite for aerospace deployment, generally outside of a planet's atmosphere, from an attachment hub, such as an ESPA-class hub having been carried into outer space by an ESPA-class vehicle. The disclosure is more particularly directed to a flexible small-sat for attachment to and deployment from an ESPA-class hub, and a method of attachment and deployment of the flexible small-sat from the ESPA-class hub.

The present invention provides a satellite that is easy to attach to an attachment hub, and which reduces cost and complexity of deployment mechanisms for detaching and deploying the satellite from the attachment hub while meeting necessary standards and requirements for satellites carried by an aerospace vehicle into outer space. While the present invention is generally direct to so-called small-sats—typically of low mass and size compared to larger satellites, such as the small-sat being under about 500 kg (about 1,100 lbs)—the present invention is equally directed to satellites of various sizes, both large and small. The present invention also may be applicable to modules for release in other release environments, such as in the atmosphere, under water, etc.

Figure 1:
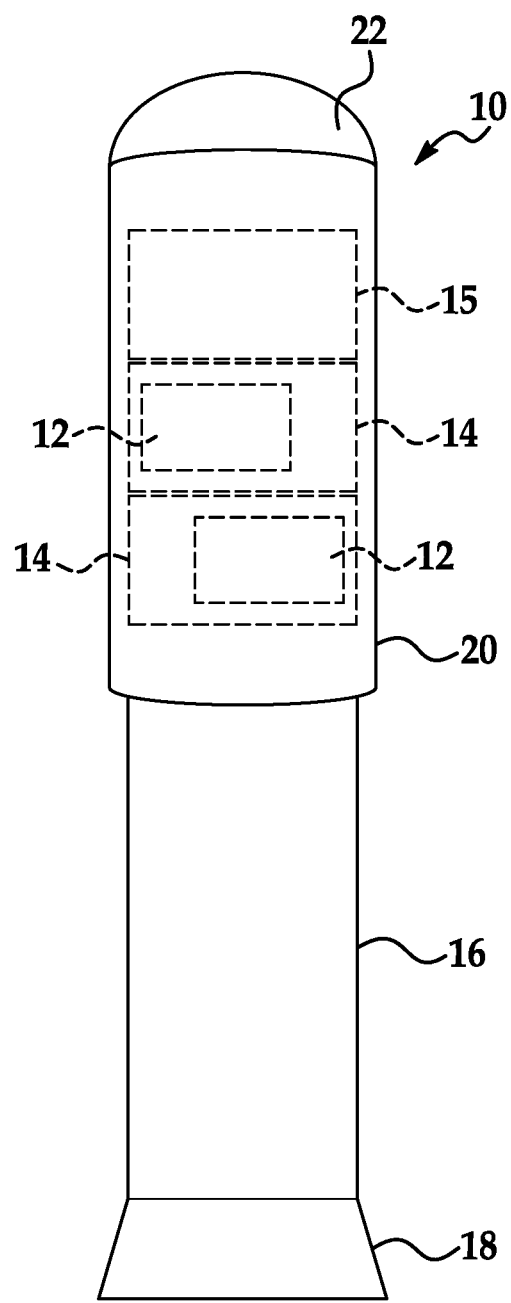
FIG. 1 is a schematic view of an aerospace vehicle including a satellite according to the present invention.

FIG. 1 illustrates an exemplary aerospace vehicle 10 for transporting equipment out of a planet's atmosphere and into a release environment having low or no atmosphere, low or no gravity, or being typically referred to as outer space. The vehicle 10 may be utilized for transporting a satellite 12 according to the present invention into a release environment while attached to an attachment hub 14.

The vehicle 10 includes a fuselage (not shown) coupled to one or more boosters 16. The booster 16 includes a nozzle 18 for directing propulsion gases outwardly from the booster 16. The fuselage may have attached to it one or more attachment hubs 14, residing within a fairing 20. The fuselage also may have attached to it one or more vehicles for being released in the release environment, such as a primary vehicle 15, such as a satellite, also residing within the fairing 20. The attachment hubs 14 and satellites 12 are not coupled directly to the primary vehicle 15 in the depicted embodiment, although a direct coupling of one or more of the attachment hubs 14 and satellites 12 to the primary vehicle 15 may be incorporated in some embodiments. In some embodiments, more than one primary vehicle 15 may be included in the vehicle 10, or the primary vehicle 15 may be omitted.

The fairing 20 is detachably releasable relative to the fuselage and protects the primary vehicle 15, the attachment hubs 14 and the satellites 12 attached to the hubs 14 during transport. The fairing 20 may include a nose cone 22, or the nose cone 22 may be otherwise attached to the fuselage and be separate from the fairing 20. The fairing 20 may be caused to detach in any suitable manner to allow release of the attachment hubs 14 (and satellites 12 attached to the hubs 14) from the remainder of the vehicle 10 when in a suitable release environment.

Figure 2:
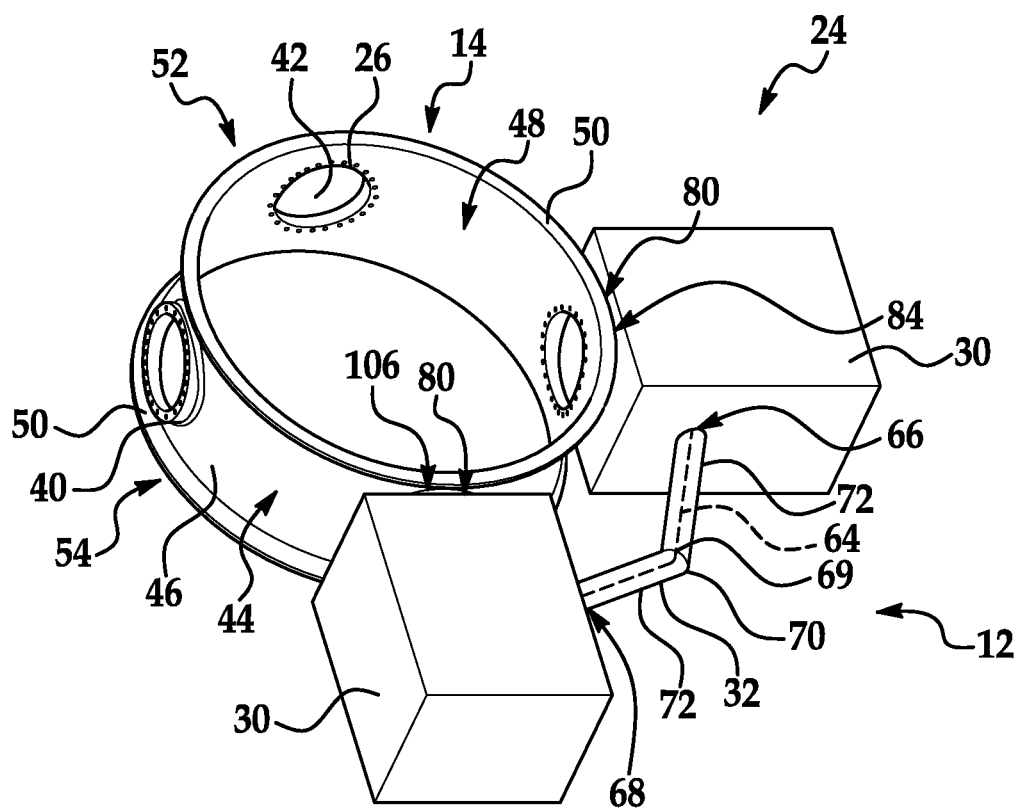
FIG. 2 is an orthogonal view of an exemplary satellite according to the present invention attached to an attachment hub.
Figure 3:
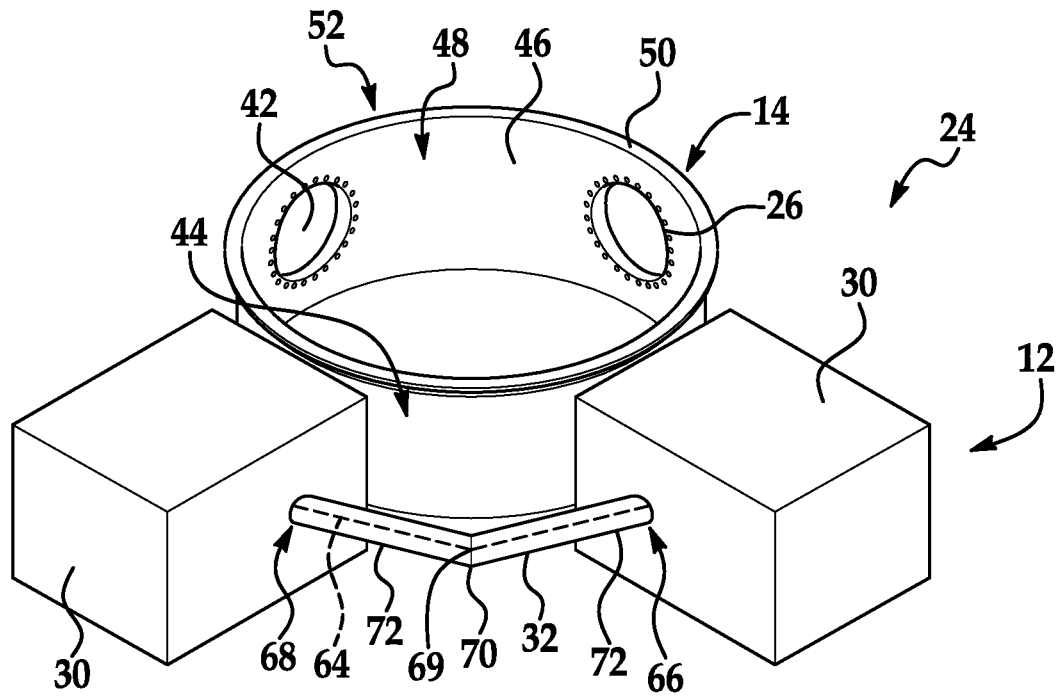
FIG. 3 is another orthogonal view of the satellite of FIG. 2.

Turning now to FIGS. 2 and 3, an exemplary satellite assembly 24 is shown, for example for use with the vehicle 10 of FIG. 1. The depicted satellite assembly 24 includes an attachment hub 14 and a single satellite 12 attached to attachment locations of the hub 14, such as ports 26. The satellite 12 includes a plurality of intercoupled payloads 30. In particular, the illustrated satellite 12 includes a pair of payloads 30 that are coupled to one another by a coupling member 32. Each of the payloads 30, which also may be referred to as a payload module or a module, is attached to a separate port 26 of the attachment hub 14.

The attachment hub 14 may be any suitable structure for stabilizing one or more payloads 30 of one or more satellites 12 during transport to a release environment. The depicted attachment hub 14 is an evolved expendable launch vehicle (EELV) secondary payload adapter (ESPA) hub having a generally rigid and annular structure, such as in the shape of a ring. The attachment hub 14 is made from any suitable material, such as a metal, such as a light-weight metal. Disposed about the annular hub are a plurality of ports 26. The depicted attachment hub 14 includes four ports 26 equally circumferentially separated about the attachment hub 14. Each of the ports 26 includes a radially outwardly projecting rim 40 for supporting attachment of the payloads 30 of the satellite 12. An aperture 42 is defined by each of the ports 26, where each aperture 42 extends fully through an annular body 46 of the attachment hub 14 from a radially outer surface 44 of the annular body 46 to a radially inner surface 48 of the annular ring body 46. Upper and lower collars 50 extend radially outwardly at each of opposite axial ends 52 and 54 of the annular body 46.

The ports 26 are each generally circular and of the same size. Each of the ports 26 is equally spaced between the opposite axial ends 52 and 54. The equal dimensions and spacing, and centered spacings, of the ports 26 promotes balancing of forces about the attachment hub 14 and uniform attachment of varied satellites 12. It will be appreciated that in other embodiments, ports 26 may be of other sizes, shapes, and have different positions relative to one another. A different number of ports 26, 1 or more, may be included.

While it is mentioned that the satellite 12 is configured to attach and to deploy from the attachment hub 14, in other embodiments not all payloads 30 or satellites 12 will necessarily need to be detached from the attachment hub 14. Rather, in some missions, one or more attached payloads 30 of a satellite 12 may remain attached to the attachment hub 14, while one or more other payloads 30 coupled to the attached payloads 30 may be released in a suitable sequence from the attachment hub 14, while remaining at least partially coupled to one or more of the attached payloads 30.

The depicted satellite 12 is configured to engage the attachment hub 14 by flexing the coupling member 32, and to provide for a passive release force of the satellite 12 from the attachment member 14. The passive release force provides for passive separation of at least one of the payloads 30 of the satellite 12 outwardly away from the attachment hub 14. In this way, the satellite 12 does not require a complex release and deployment mechanism for at least one of the payloads 30, as will be further detailed.

The pair of payloads 30 of the satellite 12 are generally required to have a limited stowed volume, mass, and weight. While the payloads 30 are schematically depicted as being rectangular, the payloads 30 may have any suitable shape, such as complying with the dimensional requirements for use with a particular attachment hub or for a particular mission. For example, the payloads 30 may be sized no greater than in the range of about a 4 foot cube to about a 1 foot cube, or in another example in the range of about 3 foot cube to about a 2 foot cube, or in another example, having dimensions of about 24 inches by about 28 inches by about 38 inches, and thus width, length, and height need not be equal to one another in any embodiment. Different payloads 30 also may be of different stowed volumes.

The payloads 30 may include any necessary equipment for completing a mission, such as visual, audio, imaging, power-providing, communication, propulsive, command, and control equipment. Equipment may include mechanical, electrical, chemical, RF, and thermal components, for example. Specific examples of equipment may include a long-range imaging camera, antenna, repeater, battery, fuel, solar array, or science experiment.

The payloads 30 are supported relative to one another during stowage, deployment, and post-deployment by the coupling member 32. The coupling member 32 is configured to allow for the passive release of at least one of the payloads 30 outwardly from a port 26 of the attachment hub 14. The coupling member 32 allows for this passive release in view of the coupling member 32 being a flexible coupling member.

For example, the illustrated coupling member 32 is a flexible boom 32 extending between and coupling together the payloads 30 of the pair of payloads 30. The boom 32 is generally cylindrical and extends along a linear central path 64 between opposite ends 66 and 68 of the boom 32. The linear central path 64 is non-straight, and includes a bend 69. The bend 69 may be a sharp angle, such as having a single vertex, or may be a curve, such as having numerous vertices.

A bend 70 of the boom 32 corresponds to the bend 69 and is located between the opposite ends 66 and 68, such as at a midpoint of the boom 32. In this way, the boom 32 is a curved boom with the bend 70 disposed between oppositely extending boom portions 72. The boom portions 72 are depicted as being of equal size and length, and being generally straight until a transition into the bend 70. The exemplary boom 32 may be solid or hollow, such as having a centrally-extending cavity.

In other embodiments, the boom 32 may include any one or more of an additional bend 70, more than two portions 72, or the portions 72 being of different shape, diameter, or length. A portion 72 may not be straight in some embodiments. The bend 70 may not be disposed at a midpoint of the flexible boom 32 in some embodiments.

The opposite ends 66 and 68 of the boom 32 are each attached to a different payload 30 to separate the payloads 30 from one another. The ends 66 and 68 may be rigidly coupled, such as fixedly coupled, to the payloads 30 by fasteners, welding, adhesives, other mechanical coupling, or any combination thereof. Other coupling methods also may be suitable.

An exemplary boom 32 has a central linear path 64 that has a chord length in the range of about 8 foot to about 2 foot, or in the range of about 7 foot to about 3 foot, or in the range of about 6 foot to 5 foot, such as about 5.5 feet.

The exemplary boom 32 has a consistent diameter along the length of the path 64. For example, the boom 32 may have a diameter in the range of about 12 inches to about 2 inches, or in the range of about 10 inches to about 4 inches, or in the range of about 8 inches to about 6 inches, such as about 7 inches.

The boom 32 may be made of any suitable material providing for sufficient stiffness and also a minimal flexibility. The boom 32 may include graphite, aluminum, beryllium, carbon fibers, or fiberglass, for example. The flexible nature of the boom 32 is effected by the material, dimensions, and overall shape of the boom 32.

The flexing of the boom 32 enables the boom 32 to be moved (via flexing) into a biased state to allow for attachment of each of the payloads 30 of the pair of payloads 30 spaced about the attachment hub 14. In particular, the boom 32 may be flexedly biased into a biased state for attachment of the satellite 12 to the ports 26 of the attachment hub 14. In the biased state, the flexible boom 32 retains strain energy that is pre-loaded in the boom 32 from the flexing of the boom 32 from a non-biased, default position into the biased position. Release of the strain energy allows for at least partial deployment of the satellite 12 outwardly from the attachment hub 14, such as allowing for the passive release of one of the payloads 30 outwardly away from a respective port 26, such as after the respective payload 30 is disconnected from the port 26. In this manner, the respective payload 30 is positioned for clearance from the attachment hub 14 after its passive release.

When the stored strain energy is released, the flexible boom 32 quickly transitions from the biased state to the default state of the boom 32. In one embodiment, the transition may comprise a shifting of the end 66 or 68 of the flexible boom 32 along a central plane that bisects the boom 32 and extends along the central linear path 64. The transition causes the payloads 30 to move to positions farther away from one another with the boom 32 in the default state than with the boom 32 in the biased state. The transition causes the shifting end 66 or 68 to linearly move in the plane a distance in the range of about 1 mm to about 10 mm, or in the range of about 2 mm to about 8 mm, or in the range of about 3 mm to about 7 mm, or in the range of about 4 mm to about 6 mm, such as about 5 mm. For example, with an attachment hub 14 having a larger diameter, a boom 32 may need to be flexed less to provide for attachment of the payloads 30 than in use with an attachment hub having a smaller diameter. This minimal movement causes an angle between the boom portions 72 to minimally increase from the biased state to the default state of the boom 32.

The boom 32 is configured such that it has a single rest length and a single default state, also referred to as a rest state. The boom 32 also is hingeless, which at least in part allows for the single rest length. As a result, the boom 32 in all configurations (such as in the biased state, in the default state, and in the transition therebetween) prevents physical engagement of the payloads 30 of the pair of payloads 30 with one another, such that the payloads 30 are spaced from one another at all configurations of the boom 32.

Although being flexible, as described above, the boom 32 also is configured to provide for sufficient stiffness of the satellite 12. The boom 32 allows for sufficient stiffness during deployed operation separate from the attachment hub 14, such as being stiff enough for a free-flying or free-maneuvering satellite 12. Due to these properties, when the satellite 12 is in the detached state (and the flexible boom 32 is in the default state), there is no need for post-deployment mating of the payloads 30 to one another merely to maintain necessary operational stiffness.

Likewise, the boom 32 also allows the satellite 12 to meet stiffness requirements while attached to the attachment hub 14, such as while stowed during launch of the vehicle 10 and transition of the vehicle 10 into a release environment. For example, when detached from the attachment hub 14, the depicted satellite 12 has a natural resonant frequency (detached frequency) of a free-free, two-body system, having two masses and a spring therebetween. When the flexible boom 32 is flexed to allow for the attachment of the satellite 12 to the attachment hub 14, and then subsequently attached to the attachment hub 14, the depicted satellite 12 has a second frequency (attached frequency) of a two mass and three spring system.

The detached satellite 12 may have a resonant frequency in the range of about 30% to about 5% of a resonant frequency when attached to the attachment hub, or in the range of about 20% to about 5% of the resonant frequency when attached to the attachment hub, or having a detached resonant frequency to attached resonant frequency ratio of about 1:10. The boom 32 is configured via its shape, size, and material to provide for such a ratio of detached resonant frequency to attached resonant frequency.

In one embodiment, a detached resonant frequency of a satellite 12 may be in the range of about 1 Hz to about 5 Hz, or in the range of about 2 Hz to about 4 Hz, or about 3.5 Hz or about 3.0 Hz. In such embodiment, an attached resonant frequency of the satellite 12 may be in the range of about 10 Hz to about 50 Hz, or in the range of about 20 Hz to about 40 Hz, or about 30 Hz, or about 35 Hz.

In view of the flexible boom 32 being hingeless and having a single default or rest state, the boom 32 allows for continuous connectivity between the payloads 30 of the pair of payloads 30. For example, in all configurations of the boom 32, the flexible boom 32 allows for continuous thermal, electrical, power, and RF connections, for example. This aspect of the satellite 12 allows for greatly increased mission utility as compared to conventional satellites having a hinged connection extending between respective payloads.

Looking now to FIGS. 4-7, the payloads 30 are each attached to the respective ports 26 by respective attachment mechanisms 80, also herein referred to as release mechanisms. Each attachment mechanism 80 physically couples an attachment portion 82 of a respective payload 30 to a rim 40 of a respective port 26. In view of the pre-load strain energy able to be imparted from the flexed boom 32 to a disconnected payload 30 upon its disconnect from the hub 14, the satellite 12 need not include two complex attachment mechanisms 80 for attaching the two payloads 30 to the attachment hub 14. Rather, the satellite 12 may include one complex attachment mechanism 106 and one non-complex, non-exotic attachment mechanism 84, the differences which will be discussed further in detail.

For example, the attachment mechanism 84 generally has fewer components and actuated portions, lower power needs, and lower cost than an alternative complex, exotic attachment mechanism, such as a Lightband. The depicted satellite 12 includes at least one non-complex, non-exotic attachment mechanism 84, which also may be less costly. The non-complex attachment mechanism 84 may be attached to the respective attachment portion 82 of the respective payload 30. In other embodiments, the non-complex attachment mechanism 84 may be separate from the satellite 12, such as being initially attached to a respective port 26 of the attachment hub 14, prior to attachment of the satellite 12 to the attachment hub 14.

Figure 4:
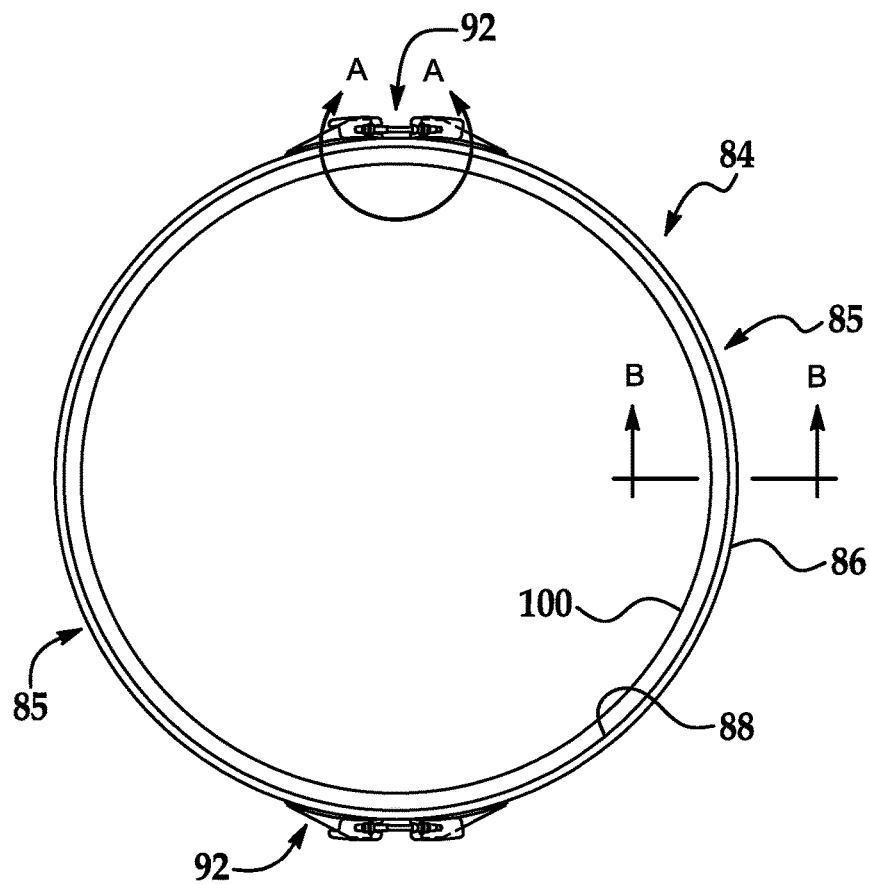
FIG. 4 is an elevational view of an exemplary release mechanism for attaching the satellite of FIG. 2 to an attachment hub.
Figure 5:
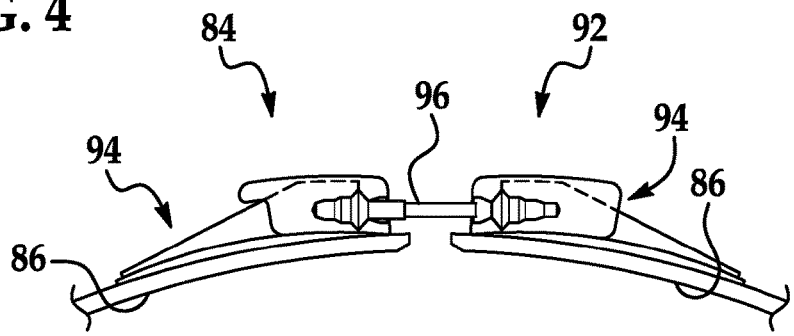
FIG. 5 is a partial view of the release mechanism of FIG. 4 shown in section A-A of FIG. 4.
Figure 6:
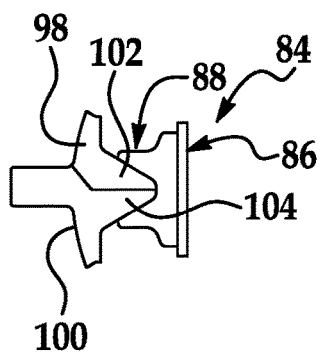
FIG. 6 is a cross-sectional view of the release mechanism of FIG. 4 taken through line B-B of FIG. 4.

Looking specifically to FIGS. 4-6, an exemplary non-complex attachment mechanism 84 is depicted. The attachment mechanism 84 is configured to detachedly release the respective payload 30 from the attachment hub 14 without applying a force to the payload 30 that would deploy the payload 30 outwardly away from the attachment hub 14. Rather, the mechanism 84, such as a modified barrel ring, is configured to be separated merely to release attachment of the respective rim 40 and respective attachment portion 82. While one exemplary mechanism 84 is depicted, alternative mechanisms may be suitable in some embodiments.

The exemplary mechanism 84 includes two separable halves 85. Each half 85 includes a strap 86 having a semi-annular shape, and a slotted segment 88 extending radially inwardly from the strap 86. The slotted segment 88 may be integral with or otherwise attached by any suitable means to the strap 86. The halves 85 are connectable to one another by connections 92 each including a set of fittings 94 that connect to form the connection 92. The depicted mechanism 84 includes a pair of connections 92 oppositely disposed at circumferentially-opposite locations about the annular shape of the mechanism 84. A fitting 94 of each of the connections 92 is connected to a fitting 94 of the other of the connections 92 by the strap 86 and slotted segment 88 of the respective half 85. A joining portion 96 extends between the fittings 94 of each connection 92. Release of one or both ends of the joining portion 96 provides for separation of the halves 85 from one another, and thus disconnection of the payload 30 and the port 26.

More particularly, the slotted segments 88 are configured to receive and retain axially-adjacent annular rings 98 and 100. One of the annular rings 98 and 100 may be integral with or otherwise attached to one of the rim 40 or the attachment portion 82, with the other of the annular rings 98 and 100 being integral with or otherwise attached to the other of the rim 40 or the attachment portion 82. Radially outer keys 102 and 104 of the annular rings 98 and 100, respectively, are shaped to be received into the slotted segments 88. The slotted segment 88 is V-shaped, and the radially outer keys 102 and 104 of the annular rings 98 and 100 together form a corresponding V-shape. In some embodiments, the keys and slots may have any other suitable corresponding shapes.

Release of one or both of the connections 92 of the attachment mechanism 84 provides for disconnect of the payload 30 and the port 26, by enabling the annular rings 98 and 100 to separate from one another when not retained in adjacent engagement with one another by the slotted segments 88. Release of the connections 92 may be by way of any suitable method, such as mechanical, electromechanical, or chemical, for example.

Figure 7:
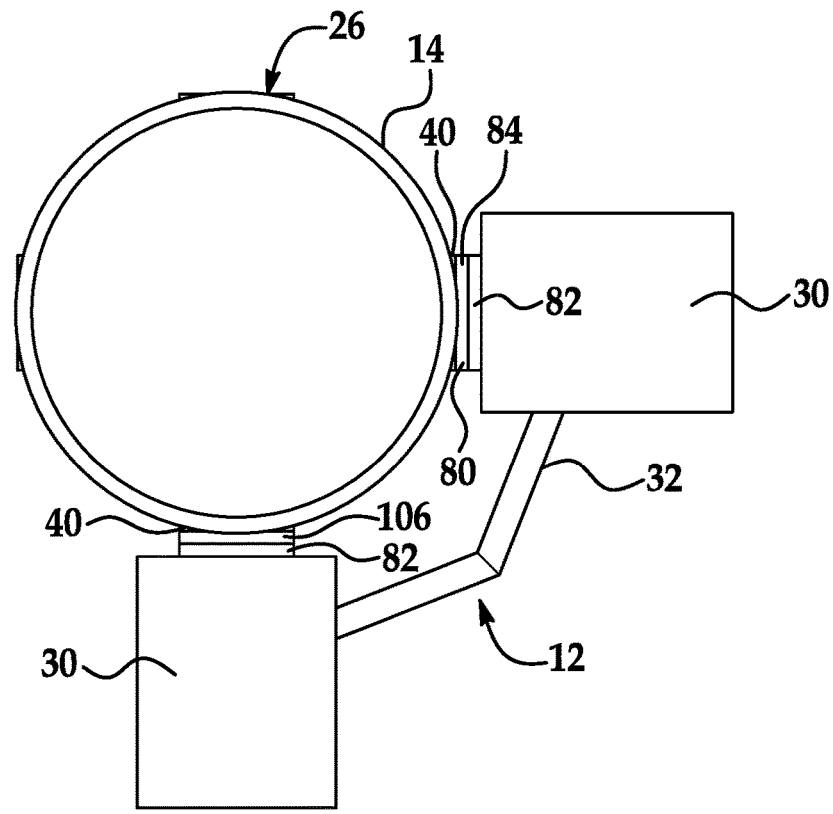
FIG. 7 is an elevational view of the satellite of FIG. 2 attached to the attachment hub shown in FIG. 2.

Turning to FIG. 7, the other of the payloads 30 is attached to the respective port 26 of the attachment hub 14 by a typical, more complex attachment mechanism 106. The more complex attachment mechanism 106 couples an attachment portion 82 of the respective payload 30 with the rim 40 of the respective port 26. The depicted satellite 12 includes the attachment mechanism 106 attached to the respective attachment portion 82 of the respective payload 30. In other embodiments, the complex attachment mechanism 106 may be separate from the satellite 12, such as being initially attached to a respective port 26 of the attachment hub 14, prior to attachment of the satellite 12 to the attachment hub 14.

Turning now FIGS. 7-10, deployment of the satellite 12 from the attachment hub 14 is depicted in sequence. The attachment mechanisms 80 are released in sequence, with the attachment mechanism 84 being released prior to the attachment mechanism 106.

At FIG. 7, the satellite 12 is attached to the attachment hub 14. Each of the attachment mechanisms 80, including the attachment mechanism 84 and the attachment mechanism 106, maintains a respective rim 40 in engagement with, or at least adjacent to, a respective attachment portion 82 of a respective payload 30 of the pair of payloads 30. The flexible boom 32 has been flexed into its biased state, thus building the pre-load force or strain energy in the flexible boom 32 that is suitable for deployment of at least one of the payloads 30. The pre-load generally provides the force typically provided by a complex release mechanism, such as the attachment/release mechanism 106.

Figure 8:
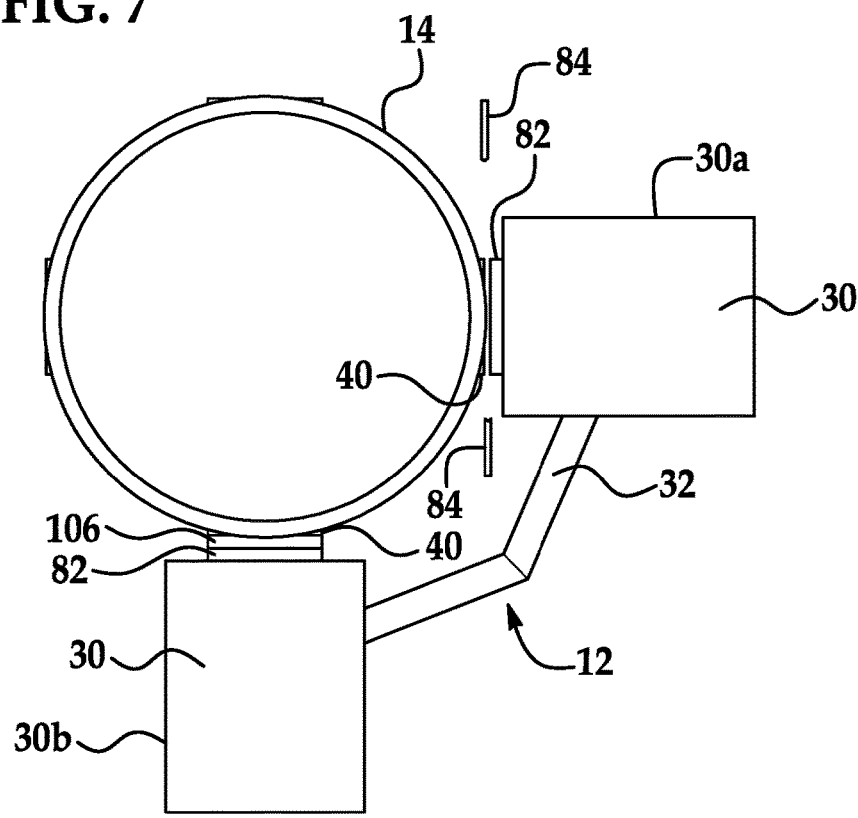
FIG. 8 is an elevational view of the satellite of FIG. 2, showing the satellite at least partially deployed from the attachment hub.

At FIG. 8, the connections 92 have been released, thereby releasing the attachment mechanism 84. The attachment portion 82 of the payload 30a is disconnected from the respective rim 40 of the port 26a to which the attachment portion 82 was attached. The release of the attachment portion 82 enables the flexible boom 32 to unflex and release the stored strain energy. The transition of the flexible boom 32 from the biased position to the default position enables the payload 30a to move outwardly away from the attachment hub 14. By using the boom 32 to effect the deployment of the payload 30a from the attachment hub 14, the need for an expensive and complex attachment mechanism at the port 26a is altogether eliminated.

Figure 9:
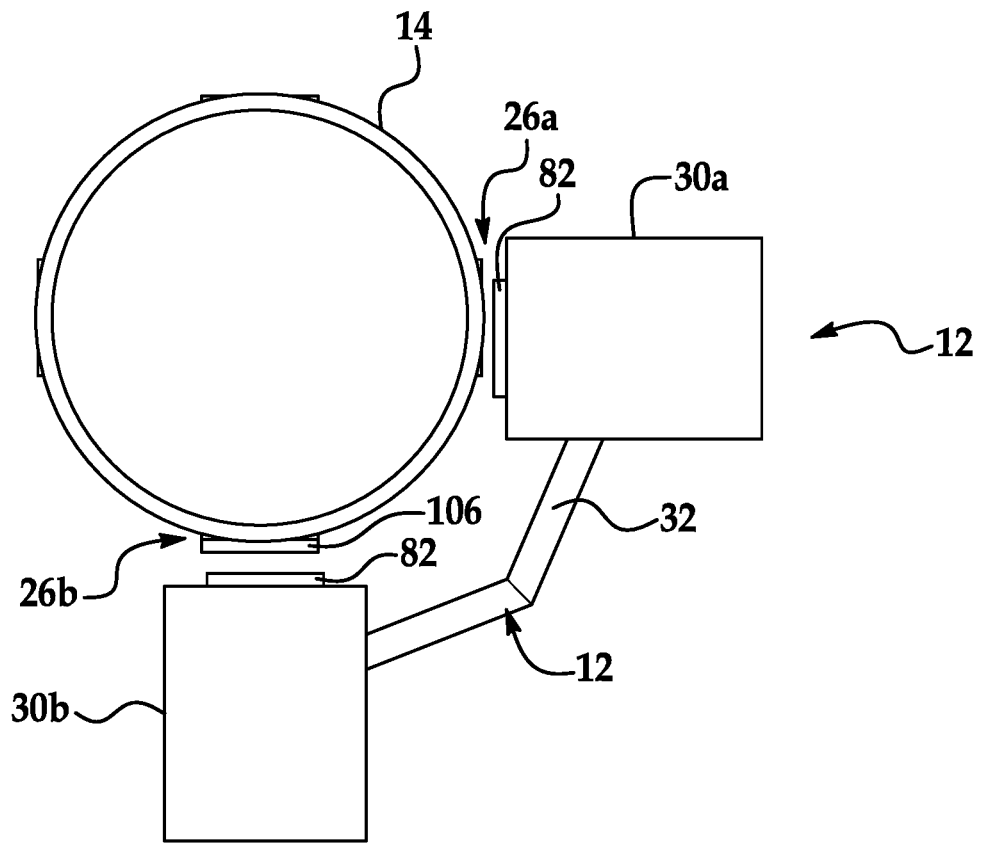
FIG. 9 is an elevational view of the satellite of FIG. 2, showing the satellite fully deployed from the attachment hub.
Figure 10:
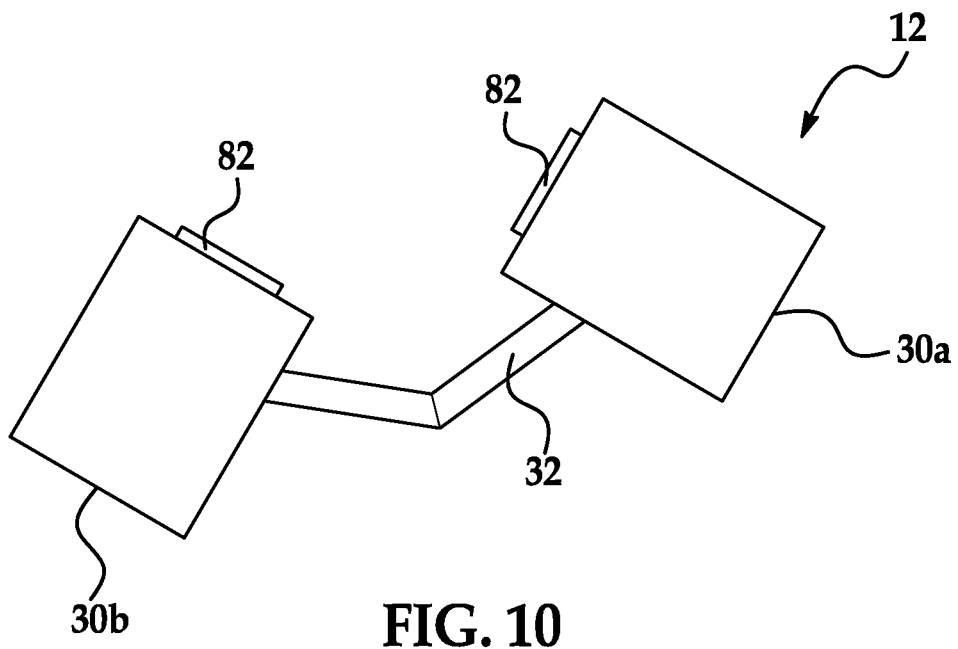
FIG. 10 is an elevational view of the satellite of FIG. 2, separate from the attachment hub.

At FIG. 9, the complex attachment mechanism 106 has been actuated, thus allowing the payload 30b to be deployed outwardly away from the port 26b. The satellite 12 is fully separated from the attachment hub 14, and is in a free-free mode for maneuvering separate from the attachment hub 14. The satellite 12 is shown apart from the attachment hub 14 in FIG. 10. The payloads 30a and 30b remain spaced from one another by the boom 32 during maneuvering and use of the satellite 12 separate from the attachment hub 14.

In summary, the satellite 12 provides for numerous benefits over conventional satellites 12. Use of the flexible boom 32 is sufficiently stiff for orbital operation, and also for stowage at an ESPA attachment hub 14. Only a negligible impact on the forces at the ESPA interface ports 26 is imparted by the flexed boom 32. The preload of the flexed boom 32 provides for rapid deployment of one payload 30 of the pair of payloads 30 from the attachment hub 14, eliminating the need for two complex attachment mechanisms 106 to deploy the satellite 12. This elimination reduces overall cost, part count and complexity of the attachment of the satellite 12 to the attachment hub 14. The flexible boom 32 does not complicate attachment, such as manual attachment, of the payload 30a to the port 26a, due to the minimal flexing needed to both build preload and engage the respective attachment portion 82 with the respective port 26. Greater mission utility is enabled via provision of a continuous connection between the payloads 30 and elimination of the need for post-deployment mating of the payloads 30 to one another. Furthermore, as shown in FIGS. 11-14, the concept of the present invention can be expanded to include additional payloads 30, such as using additional flexible booms 32.

Figure 11:
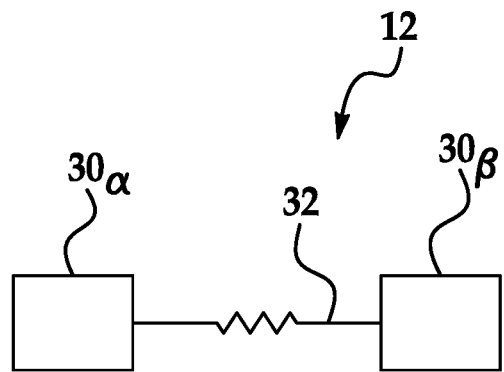
FIG. 11 is a schematic representation of the satellite of FIG. 2 in a deployed state.
Figure 12:
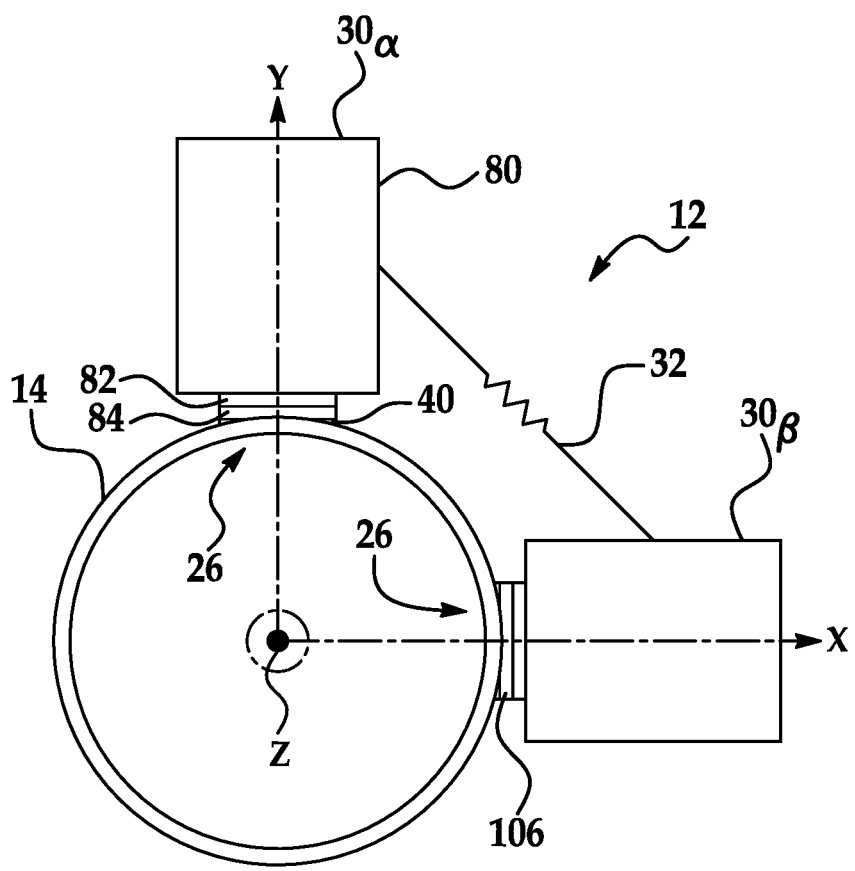
FIG. 12 is a schematic representation of the satellite of FIG. 2 in a stowed state.

Referring now in part to FIGS. 11 and 12, the present disclosure includes a design methodology for a satellite 12 having passive deployment of at least one of the payloads 30 of the satellite 12 from a respective attachment hub 14. As previously indicated, the depicted satellite 12 is configured to meet the stiffness requirements of a satellite attached to and carried by an attachment hub 14 during launch or travel to a release environment, while also providing for a sufficiently stiff freely-detached satellite enabling controlled movement in the release environment separated from the attachment hub 14.

In the schematic illustrations of FIGS. 11 and 12, the two payloads are identified as payload $30_\alpha$ and payload $30_\beta$. The payload $30_\alpha$ is attached to the attachment hub 14 by a non-complex attachment mechanism 84, while the payload $30_\beta$ is attached to the attachment hub 14 by a complex attachment mechanism 106. FIG. 11 depicts the free, detached, or deployed state of the satellite 12 as a two-mass, one spring system. FIG. 12 depicts the stowed or attached state of the satellite 12 as a two-mass, three spring system, with the additional two springs being the attachment mechanisms 84 and 106.

The deployed system of FIG. 11 has a natural frequency which can be represented by Equation 1, with $\omega_n$ being the natural frequency, $K_{32}$ being the spring constant of the boom 32, and $m_\alpha$ and $m_\beta$ representing the masses of the coupled payloads $30_\alpha$ and $30_\beta$ of the pair of payloads 30. With respect to Equation 1, the masses of the payloads $30_\alpha$ and $30_\beta$ can be assumed to be equal in some embodiments.

$$\omega_n = \sqrt{K_{32} \frac{(m_\alpha + m_\beta)}{(m_\alpha * m_\beta)}} \qquad \text{Equation 1}$$

The stowed system of FIG. 12 has a second and higher frequency $\omega_2$ represented by Equations 2 and 3. Again, in such equations, the masses of the payloads $30_\alpha$ and $30_\beta$ can be assumed to be equal in some embodiments, and thus m represents either of $m_\alpha$ or $m_\beta$. For at least the Equations 2 and 3, the spring constant $K_{84}$ of the non-complex attachment mechanism 84 and the spring constant $K_{106}$ of the complex attachment mechanism 106 can be assumed to be equal in some embodiments, and thus K represents either of $K_{84}$ or $K_{106}$.

$$\omega_1 = \sqrt{\frac{K}{m}} \qquad \text{Equation 2}$$

$$\omega_2 = \sqrt{\frac{K + 2K_{32}}{m}} \qquad \text{Equation 3}$$

Additionally, in the stowed state of the satellite 12, and thus in the biased state of the boom 32, the stiffness of the boom 32 is derived from a target natural frequency, via Equation 4. The preload force $F_{PL}$ of the boom 32, providing for the passive release of one of the payloads 30 from the attachment hub 14 after release of the attachment mechanism 84, is represented by Equation 5. In Equation 5, $\Delta R_\alpha$ is the deflection distance of the respective payload 30 outwardly from the attachment hub 14 upon the release of the preload force.

$$K_{32} = \omega_n^2 * \frac{m}{2} \qquad \text{Equation 4}$$

$$F_{PL} = K_{32} \Delta R_\alpha \qquad \text{Equation 5}$$

With respect to the above-provided Equations 1 to 5, relevant dimensions and properties of three satellite embodiments are provided below in Table 1. For example, the different embodiments represent aspects of satellites 12 that may be used with differing attachment hubs 14 having different diameters and numbers of ports 26 (i.e., different circumferential spacing between ports 26).

TABLE 1

| | Embodiment 1 | Embodiment 2 | Embodiment 3 |
|---|---|---|---|
| $m_\alpha, m_\beta$ | 180 Kg | 320 Kg | 180 Kg |
| $K_{32}$ | 43.5 × 10³ N/m | 77.3 × 10³ N/m | 32.0 × 10³ N/m |
| $K_{84}$, $K_{106}$ | 8.70 × 10⁶ N/m | 15.4 × 10⁶ N/m | 8.70 × 10⁶ N/m |
| $\omega_n$ | 3.5 Hz | 3.5 Hz | 3.0 Hz |
| $\omega_1$ | 35.0 Hz | 34.9 Hz | 35.0 Hz |
| $\omega_2$ | 35.2 Hz | 35.1 Hz | 35.1 Hz |
| $F_{PL}$ | 50 lb | 100 lb | 25 lb |
| $\Delta R_\alpha$ | 5.1 mm | 5.8 mm | 3.5 mm |

In view of the flexing of the satellite 12 to allow for attachment of the satellite 12 to an attachment hub 14, the satellite 12 will apply a torque to at least one of the respective ports 26 to which a respective payload 30 is attached. Where an assumption is made that a complex attachment mechanism 106 imparts no torque, or that $K_{106}$ is indefinitely rigid, the exemplary boom 32 will impart a torque on the rim 40 attached to the attachment mechanism 84 and to the payload $30_\alpha$.

In the exemplary case of Embodiment 3 of Table 1 (with the added assumption of $K_{84} \neq K_{106}$), a torque on the respective rim 40 attached to the attachment mechanism 84 may be in the range of about 5 Nm to about 35 Nm, or in the range of about 10 Nm to about 30 Nm, or in the range of about 20 Nm to about 25 Nm, such as about 21 Nm.

In the same modified exemplary case of Embodiment 3 of Table 1, where the torque capability specified at a rim 40 of an annular ESPA-attachment hub 14 is about 1.2×10³ Nm, the imparted torque from the flexible boom 32 may be equal to or less than about 1% to about 5% of the torque allowed at the rim 40 via specification. For example, the torque may be in the range of about 1.5% to about 3% of the allowable torque, or about 1.7% of the allowable torque capability.

Turning now to FIGS. 13 to 16, another exemplary satellite is shown at 112. The satellite 112 uses the same reference numerals used to refer to the satellite 12, but indexed by 100. In addition, the foregoing description of the satellite 12 is equally applicable to the satellite 112 except as noted below. Moreover, it will be appreciated upon reading and understanding the specification that aspects of the satellites 12 and 112 may be substituted for one another or used in conjunction with one another where applicable.

Figure 13:
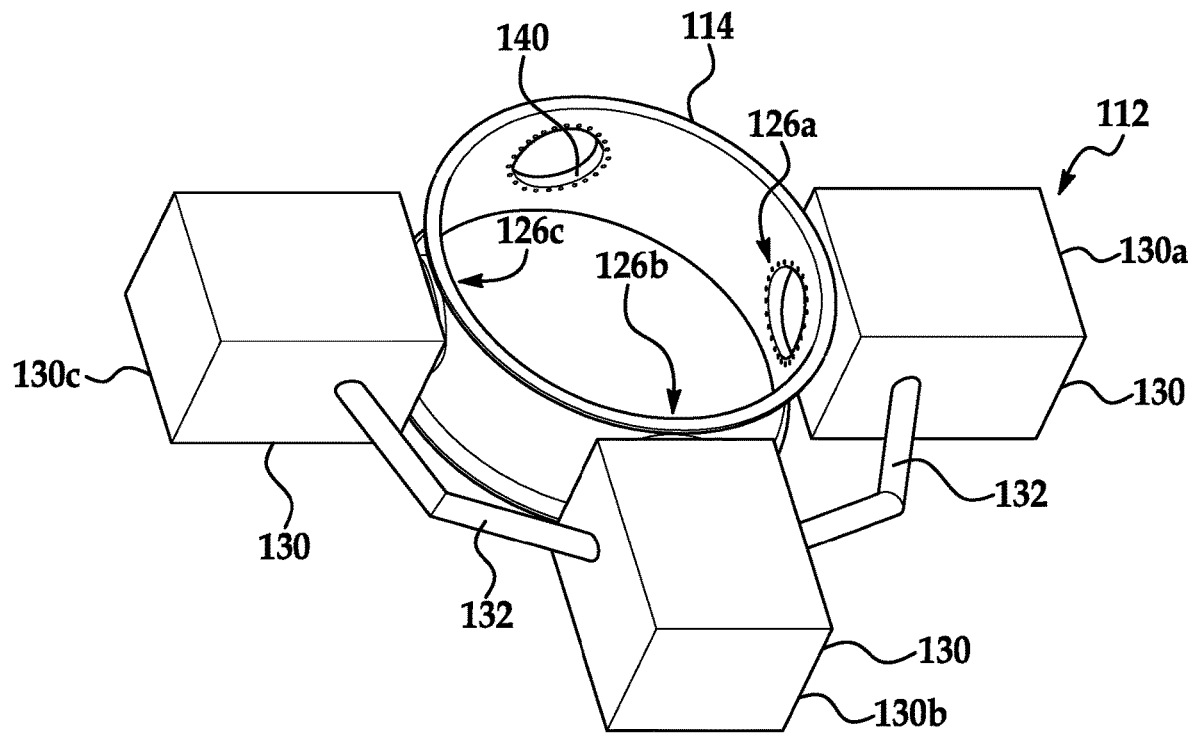
FIG. 13 is an orthogonal view of another exemplary satellite according to the present invention attached to an attachment hub.

Turning first to FIG. 13, the satellite 112 is shown attached to an attachment hub 114. The satellite 112 includes a plurality of payloads 130 and plurality of flexible booms 132. A satellite 112 according to the present invention may include two initial payloads 130 coupled to one another by a flexible boom 132, with additional payloads 130 connected to the initial payloads 130, such as in series, and such as by additional flexible booms 132.

The depicted satellite 112 includes three payloads 130 where adjacent payloads 130 are coupled to one another, such as in series, by flexible booms 132. While the payloads 130 are each depicted as having identical volume, their volumes may differ in some embodiments. Likewise, while the flexible booms 132 are depicted as being identical, the booms 132 may differ in any one or more of shape, size, length, or proportions in other embodiments.

Figure 14:
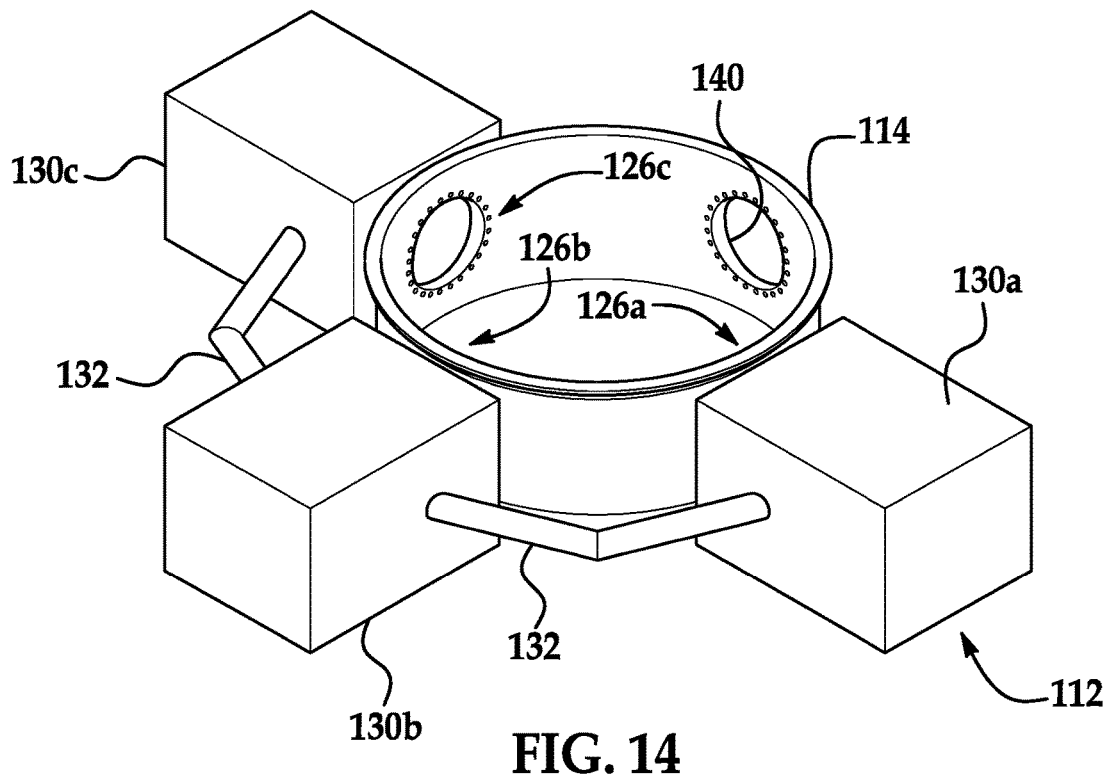
FIG. 14 is another orthogonal view of the satellite of FIG. 13.
Figure 15:
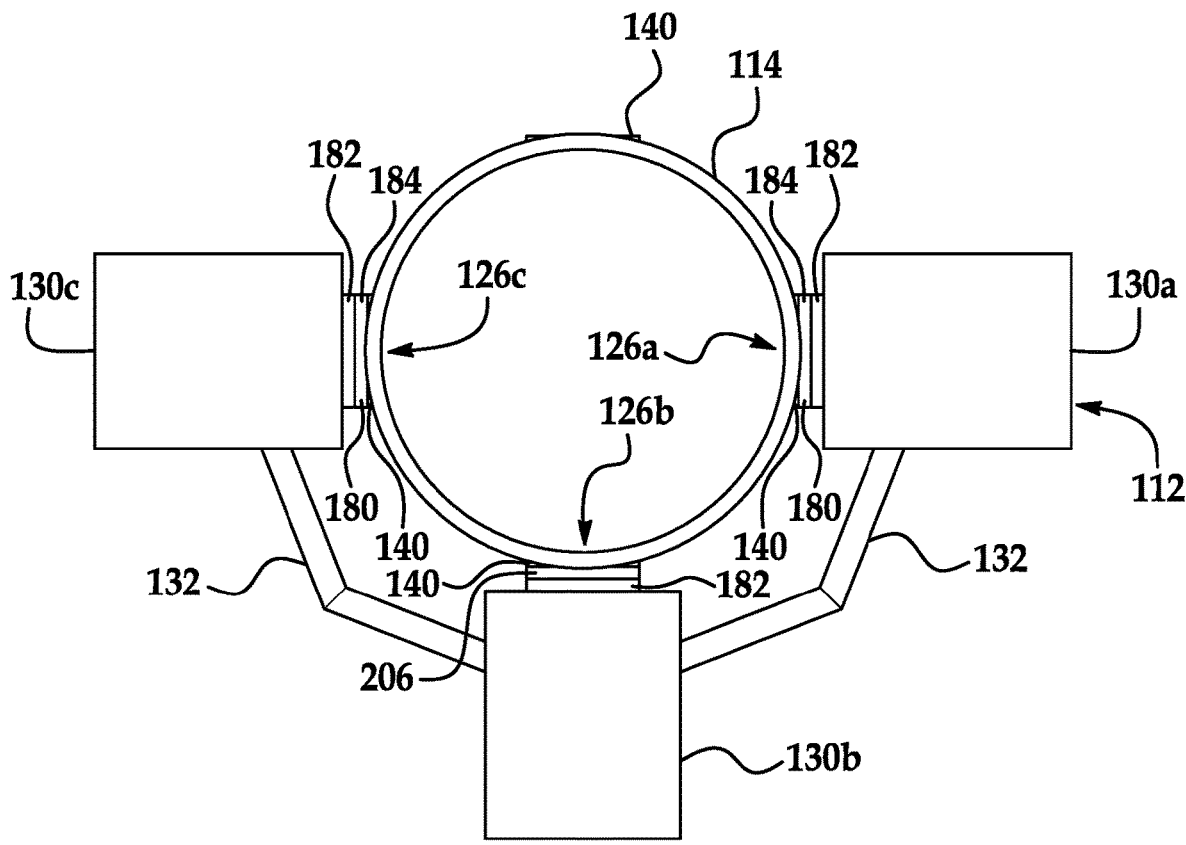
FIG. 15 is an elevational view of the satellite of FIG. 13, showing the satellite attached to the attachment hub shown in FIG. 13.

At FIGS. 13 to 15, the satellite 112 is attached to the attachment hub 114. Two non-complex attachment mechanisms 184 and one attachment mechanism 206 maintain respective rims 140 in engagement with, or at least adjacent to, respective attachment portions 182 of respective payloads 130. The flexible booms 132 have been flexed into their respective biased states. The attachment mechanisms 184 are utilized for disconnecting the outer payloads 130a and 130c from the attachment hub 114.

To deploy the satellite 112 from the attachment hub 114, the attachment mechanisms 180 are released in a sequence, with the attachment mechanisms 184 at the ports 126a and 126c each being released prior to the attachment mechanism 206 at the port 126b. The attachment mechanisms 184 may be released simultaneously, or one may be released prior to release of the other.

For example, when the connections (same as connection 92 of FIG. 5) of the two attachment mechanisms 184 have been released, thereby releasing the attachment mechanisms 184, the attachment portions 182 of the payloads 130a and 130c are disconnected from the respective rims 140 of the ports 126a and 126c to which the attachment portions 182 were attached. The release of the attachment portions 182 enables the flexible booms 132 to unflex and release the stored strain energy. The transition of the flexible booms 132 from the biased positions to the default positions enables the payloads 130a and 130c to move outwardly away from the attachment hub 114. By using the booms 132 to effect the deployment of the payloads 130a and 130c from the attachment hub 114, the need for expensive and complex attachment mechanisms at the ports 126a and 126c is altogether eliminated.

Figure 16:
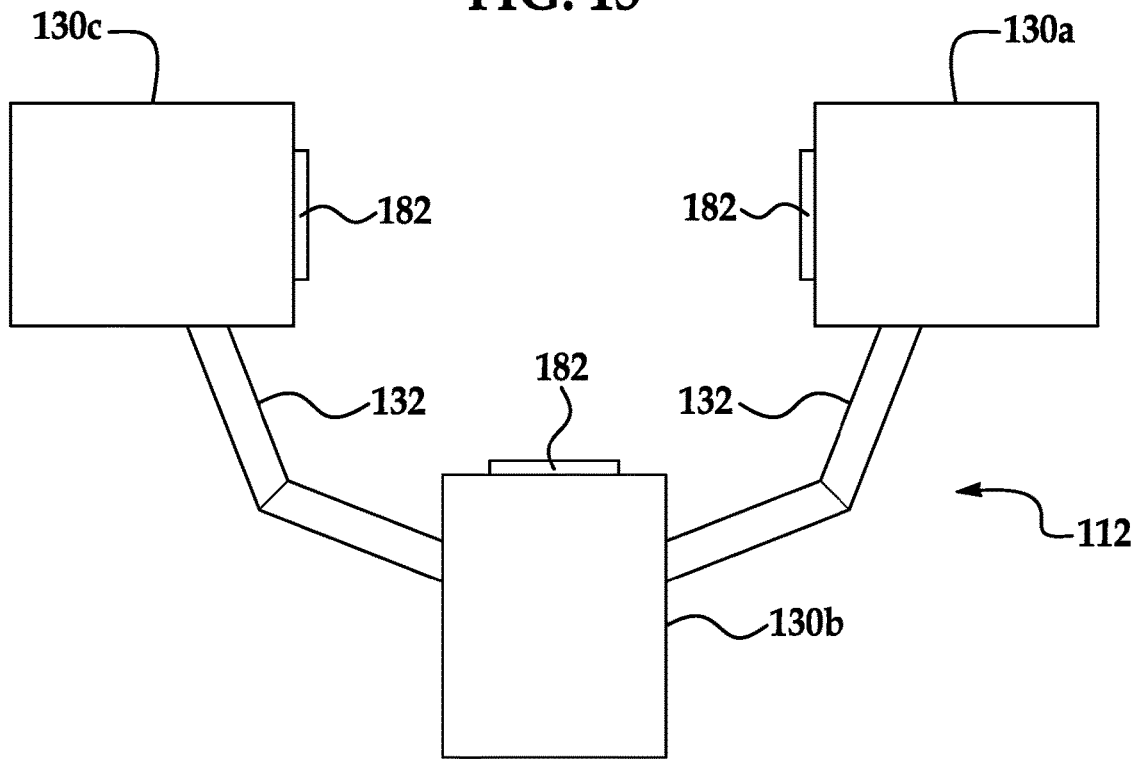
FIG. 16 is an elevational view of the satellite of FIG. 13, separate from the attachment hub.

At FIG. 16, the complex attachment mechanism 206 (FIG. 15) also has been actuated, thus allowing the payload 130b to be deployed outwardly away from the port 126b. The satellite 112 is fully separated from the attachment hub 114. The payloads 130a, 130b, and 130c remain spaced from one another by the booms 132 during maneuvering and use of the satellite 112.

In some embodiments, an attachment mechanism 184 may be used to disconnect the intermediate payload 130b, and a complex attachment mechanism instead may be used to deploy one of the payload 130a or the payload 130c. In even other embodiments, only one of the payload 130a or the payload 130c may be disconnected from the attachment hub 114 via a non-complex attachment mechanism 184, with the other two of the payloads 130 being deployed via complex attachment mechanisms 206.

Looking still to FIGS. 13 to 16, but also to FIGS. 7 to 10, the present invention includes a method of deployment of a satellite 12, 112 from an attachment hub 14, 114. The method includes the steps of (a) providing the satellite 12, 112, having a pair of payloads 30, 130 with a flexible boom 32, 132 extending therebetween, and each of the payloads 30, 130 being coupled to the attachment hub 14, 114; (b) releasing the coupling of one of the payloads 30, 130 relative to the attachment hub 14, 114; and (c) transitioning the flexible boom 32, 132 from a biased state having stored strain energy to a default state, thereby outwardly deploying the one of the payloads 30, 130 from the attachment hub 14, 114 via release of the stored strain energy from the flexible boom 32, 132. The method may include wherein the release of the stored strain energy from the flexible boom 32, 132 includes the boom 32, 132 unflexing from being flexed in the biased state. The method may further include the step (d) of releasing an attachment mechanism 84, 184 selectively coupling the payload 30, 130 to the attachment hub 14, 114, without the attachment mechanism 84, 184 applying a force to the payload 30, 130 that would deploy the payload 30, 130 outwardly away from the attachment hub 14, 114.

In summary, and with reference to each of the aforementioned embodiments, the present disclosure provides an exemplary satellite 12, 112 that includes a pair of payloads 30, 130 coupled to one another by a flexible boom 32, 132, where the flexible boom 32, 132 is configured to enable easy manual engagement of the pair of payloads 30, 130 with an associated attachment hub 14, 114, and also to provide a passive release force for deploying at least one of the payloads 30, 130 in a direction outwardly from the attachment hub 14, 114. Potential energy for enabling the passive release is provided as stored strain energy in the flexible boom 32, 132 when flexed for attachment of the payloads 30, 130 to the attachment hub 14, 114. The strain energy is released upon release of at least one of the payloads 30, 130 from the attachment hub 14, 114, which release may be by way of a non-complex, non-exotic attachment mechanism 84, 184. Additional payloads 30, 130 may be connected in series to the pair of payloads 30, 130, with a flexible boom connecting adjacent payloads 30, 130. The additional payloads 30, 130 may be released from the attachment hub 14, 114 via attachment mechanism 84, 184 or by a complex attachment mechanism 106, 206.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A satellite, comprising:
   a pair of payloads; and
   a flexible boom extending between and coupled to each of the payloads,
   wherein the satellite is configured to engage an attachment hub by flexing the boom, and to provide for a passive release force of the satellite from the attachment hub, wherein the boom is flexed between a biased state in which the boom is pre-loaded to retain strain energy in the boom whereby each of the payloads is attached to the attachment hub, and a non-biased default state in which the stored strain energy is released from the boom whereby at least one of the payloads is passively released from the attachment hub.

2. The satellite of claim 1, wherein the passive release force provides for passive separation of at least one of the payloads outwardly away from the attachment hub.

3. The satellite of claim 1, wherein the flexing of the boom allows for attachment of each of the payloads spaced from one another about the hub.

4. The satellite of claim 1, wherein the flexible boom has a single rest position.

5. The satellite of claim 1, wherein the flexible boom extends along a non-straight linear central path between the payloads.

6. The satellite of claim 1, wherein the flexible boom is a hingeless boom.

7. The satellite of claim 1, wherein at least one of the payloads includes an attachment mechanism that is configured to detachably release the payload from the attachment hub without applying a force to the payload to deploy the payload outwardly away from the attachment hub.

8. The satellite of claim 1, wherein the boom in all configurations allows for continuous thermal or electrical connection between the payloads.

9. The satellite of claim 1, wherein the boom in all configurations is configured to prevent direct physical engagement of the payloads with one another.

10. The satellite of claim 1, further including a third payload and a second flexible boom extending between and coupled to the third payload and one payload of the pair of payloads, and wherein the satellite including the three payloads and the two flexible booms is configured to engage the attachment hub by flexing the two booms, and to provide for a passive release force of the satellite from the attachment hub.

11. A satellite assembly including the attachment hub having a plurality of ports and the satellite of claim 1, wherein at least one payload of the pair of payloads is attached to the attachment hub at one of the ports.

12. A satellite, comprising:
a pair of payloads each having an attachment portion for separately attaching to a port of an attachment hub; and
a boom extending between and coupled to each of the payloads of the pair of payloads, wherein the boom is configured to transition between a biased state for attachment of the pair of payloads to the attachment hub, with the boom having stored strain energy when in the biased state, and a non-biased default state for at least partial deployment of at least one of the pair of payloads outwardly from the attachment hub, after the boom is flexed to release the stored strain energy.

13. The satellite of claim 12, wherein the payloads are spaced closer together when the boom is in the biased state than when the boom is in the default state.

14. The satellite of claim 12, wherein the boom is configured such that it has a single default state.

15. The satellite of claim 12, wherein the boom in all states is configured to allow for continuous thermal or electrical connection between the payloads.

16. The satellite of claim 12, wherein the boom in all states is configured to prevent direct physical engagement of the payloads with one another.

17. The satellite of claim 12, further including a third payload and a second boom extending between and coupled to the third payload and one payload of the pair of payloads, and wherein the second boom is configured to transition between a biased state for attachment to the attachment hub, with the second boom having stored energy, and a default state for at least partial deployment outwardly from the attachment hub, after release of the stored energy.

18. A method of deployment of a satellite from an attachment hub, the method including the steps of:
providing the satellite having a pair of payloads with a flexible boom extending therebetween, and each of the payloads being coupled to the attachment hub by an attachment mechanism;
releasing the attachment mechanism coupled between a first of the payloads and the attachment hub; and
transitioning the flexible boom from a biased state having stored strain energy to a non-biased default state, thereby outwardly deploying the first of the payloads from the attachment hub via release of the stored strain energy from the flexible boom.

19. The method of claim 18, wherein the release of the stored strain energy from the flexible boom includes the boom unflexing from being flexed in the biased state.

20. The method of claim 18, further including the step of releasing the attachment mechanism, without the attachment mechanism applying a force to the first of the payloads that would deploy the first of the payloads outwardly away from the attachment hub.

* * * * *